US008751163B2

(12) United States Patent  (10) Patent No.: US 8,751,163 B2
Mitchell                                       (45) Date of Patent:     Jun. 10, 2014

(54) SYSTEM AND METHOD FOR PROVIDING AN ELECTRONIC REPRESENTATION OF A ROUTE

(75) Inventor: Peter Mitchell, Dublin (IE)

(73) Assignee: Fleetmatics IRL Limited, Dublin (IE)

( * ) Notice: Subject to any disclaimer, the term of this patent is extended or adjusted under 35 U.S.C. 154(b) by 154 days.

(21) Appl. No.: 13/083,222

(22) Filed: Apr. 8, 2011

(65) Prior Publication Data

US 2012/0259545 A1   Oct. 11, 2012

(51) Int. Cl.
   *G01C 21/00*   (2006.01)
   *G06F 19/00*   (2011.01)
(52) U.S. Cl.
   USPC ............................. 701/527; 701/409; 340/989
(58) Field of Classification Search
   USPC .................. 701/527, 409, 426, 540; 705/4;
                        340/989; 382/103, 241, 285, 199
   See application file for complete search history.

(56) References Cited

U.S. PATENT DOCUMENTS

| 4,974,170 | A | 11/1990 | Bouve et al. |
| 5,682,525 | A | 10/1997 | Bouve et al. |
| 6,148,260 | A | 11/2000 | Musk et al. |
| 6,505,106 | B1 | 1/2003 | Lawrence et al. |
| 7,388,518 | B2 | 6/2008 | Mitchell et al. |
| 7,587,276 | B2 * | 9/2009 | Gold et al. ................ 701/426 |
| 7,827,507 | B2 * | 11/2010 | Geise et al. ............... 715/850 |
| 2004/0218910 | A1 | 11/2004 | Chang et al. |
| 2004/0249565 | A1 * | 12/2004 | Park .......................... 701/200 |
| 2007/0150188 | A1 | 6/2007 | Rosenberg |
| 2007/0239322 | A1 | 10/2007 | McQuade et al. |
| 2008/0300784 | A1 | 12/2008 | Kleinstern et al. |
| 2009/0216435 | A1 * | 8/2009 | Zheng et al. .............. 701/209 |
| 2010/0057334 | A1 | 3/2010 | Ramaswamy et al. |
| 2010/0125409 | A1 * | 5/2010 | Prehofer ................... 701/207 |

FOREIGN PATENT DOCUMENTS

| DE | 10151354 | 5/2003 |
| DE | 10 2006 056 874 | 6/2008 |
| GB | 2337653 | 11/1999 |
| GB | 2 345 824 | 7/2000 |
| WO | WO 2008/065131 | 6/2008 |

OTHER PUBLICATIONS

U.S. Appl. No. 12/391,516, filed Feb. 24, 2009, Jiajun Zhu.

* cited by examiner

*Primary Examiner* — Tan Q Nguyen
(74) *Attorney, Agent, or Firm* — Frommer Lawrence & Haug LLP

(57) ABSTRACT

Disclosed is a computer systems, methods and computer program products for providing an electronic representation of a route. A display device displays a plurality of sequential displays of the ground level area representations along the recorded route including: a first display comprising an origin location area representation; a plurality of sequential displays comprising sequential location area representations along the route; and a last display of a destination location area representation. The at least one ground level image can be a photographic image. A record of a route is recorded by a GPS device.

21 Claims, 6 Drawing Sheets

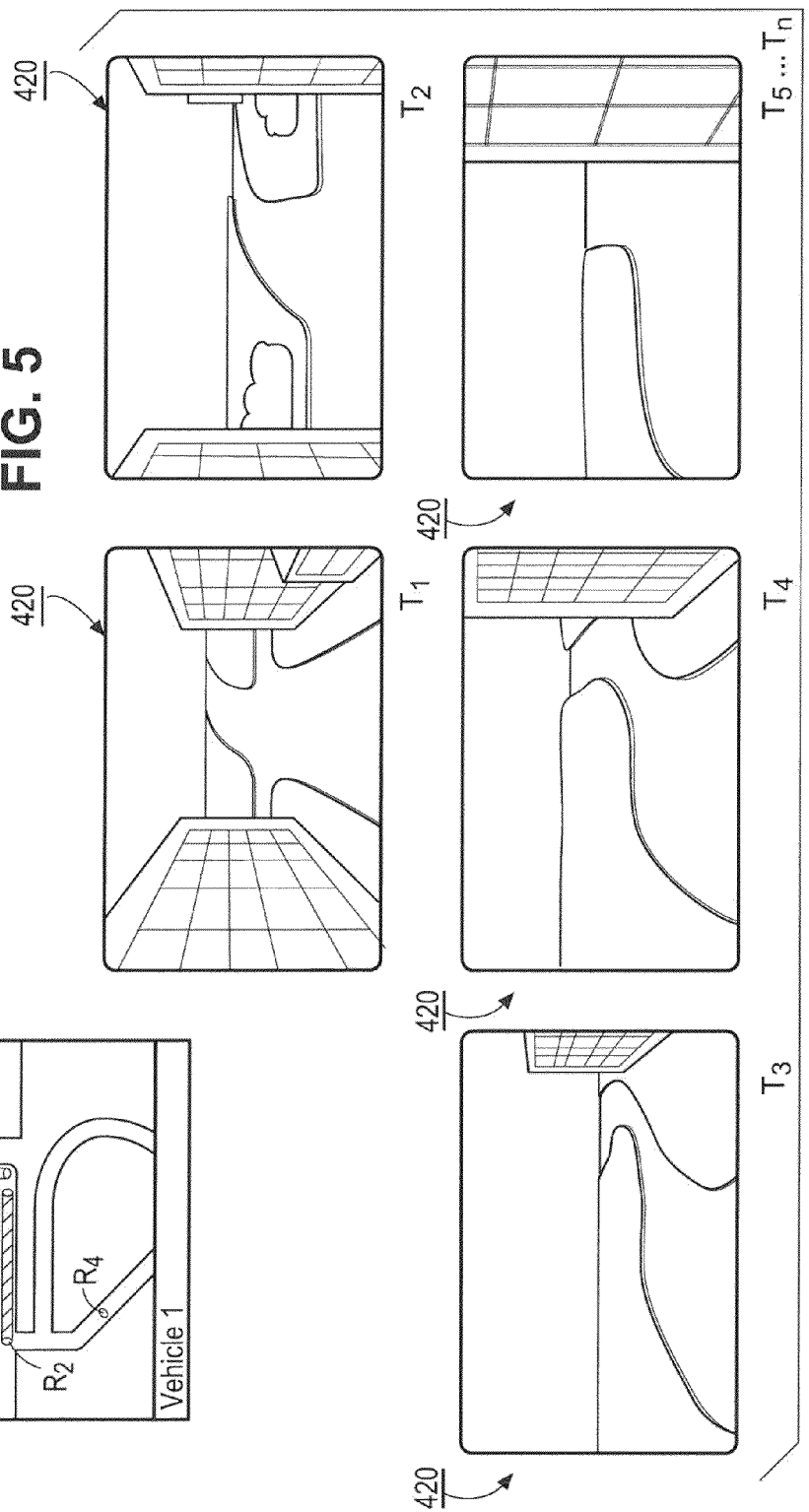

SYSTEM AND METHOD FOR PROVIDING AN ELECTRONIC REPRESENTATION OF A ROUTE

DESCRIPTION OF RELATED ART

The invention disclosed herein relates to electronic presentation and use of maps and other area representations (including geographic and non-geographic areas), and related information, and to the interactive use thereof. The presentations may be provided to users via any type of communications or computer network (including wired and/or wireless), such as an intranet, LAN, WAN or the Internet, a system including interactive television, or may be provided in local storage, e.g., in a client or server hard disk or CD, etc.

Electronically presented maps are available over the Internet. See, for example, Google Maps (http://maps.google.com/maps), www.mapquest.com, www.mapsonus.com, www.maps.expedia.com, www.maps.yahoo.com (accessed through www.yahoo.com), www.maps.com, www.maps.excite.com, (accessed through www.excite.com), and www.mapblast.com. Also see U.S. Pat. Nos. 4,974,170, 5,682,525 and 6,148,260.

In particular, services such as Google Maps are capable of displaying street level images of geographic locations. These images, identified in Google Maps as "Street Views," typically comprise photographs of buildings and other features and allow a user to view a geographic location from a person's perspective as compared to a top-down map perspective. The street level images tend to be taken at discrete locations. The Google Maps service provides a variety of mechanisms that allow a user to change from street level image at one location to another, such as clicking an arrow icon. The Google Maps service also shows an animated transition between two street level images. For example, if the user indicates that he or she wants to move forward to the next image, the client computer is provided with instructions to zoom into the current street level. The zooming is intended to convey the impression of travelling into the image. Similarly, if the user moves to the next street level image, the currently-displayed image pans to the right or left, respectively. A description of such "Street Views" can be found in U.S. patent application Ser. No. 12/391,516, the entirety of which is incorporated by reference herein.

It is known to provide an on-board unit which uses technology such as GPS (Global Positioning System) to monitor a vehicle's positions and transmit wireless uploads or otherwise broadcast to a central host system as well as manage of incoming data traffic without data losses or corruption and/or without database record locking. Such a unit may also upload vehicle status events such as engine fault events. GB2345824 and U.S. Pat. No. 7,388,518 describes such systems and methods therefor, the entirety of each of which are incorporated by reference herein.

SUMMARY

According to an embodiment, disclosed is a method of providing an electronic representation of a route, comprising, in at least one computer and a computer readable storage medium or media including computer code: accessing a stored record of a route from an origin location to a destination location; receiving a plurality of ground level area representations of locations corresponding locations along the recorded route including an origin location and a destination location; the at least one computer and the computer readable storage medium or media including computer code that causes the at least one computer to cause a display device to display thereon a plurality of sequential displays of the ground level area representations along the recorded route including: a first display comprising an origin location area representation; a plurality of sequential displays comprising sequential location area representations along the route; and a last display of a destination location area representation. In an embodiment the at least one ground level image is a photographic image. In an embodiment, disclosed is receiving a record of a route recorded by a GPS device.

In connection with an embodiment, disclosed is a computer system including at least one computer processor and computer readable storage medium or media including computer code configured to provide an electronic representation of a route. The system comprises one or more processors programmed at least to: access, in a memory operatively coupled to at least one of the processors, a record of a route from an origin location to a destination location; receive a plurality of ground level area representations of locations corresponding locations along the recorded route including an origin location and a destination location; and cause display device to display thereon a plurality of sequential displays of the ground level area representations along the recorded route including: a first display comprising an origin location area representation; a plurality of sequential displays comprising sequential location area representations along the route; and a last display of a destination location area representation. In an embodiment the at least one ground level image is a photographic image. In an embodiment, disclosed is receiving a record of a route recorded by a GPS device.

According to an embodiment, disclosed is a computer program product comprising a computer-readable storage medium encoded with instructions that, when executed by at least one processor within a computer system that comprises one or more processors and a memory operatively coupled to at least one of the processors, cause the computer system at least to: access, in a memory operatively coupled to at least one of the processors, a record of a route from an origin location to a destination location; receive a plurality of ground level area representations of locations corresponding locations along the recorded route including an origin location and a destination location; and cause display device to display thereon a plurality of sequential displays of the ground level area representations along the recorded route including a first display comprising an origin location area representation; a plurality of sequential displays comprising sequential location area representations along the route; and a last display of a destination location area representation. In an embodiment the at least one ground level image is a photographic image. In an embodiment, disclosed is receiving a record of a route recorded by a GPS device.

BRIEF DESCRIPTION OF THE DRAWINGS

Embodiments of the invention are illustrated in the figures of the accompanying drawings, which are meant to be exemplary and not limiting, and in which like references are intended to refer to like or corresponding things.

FIG. 5 depicts and exemplary display for a sequence of ground level representations of a route.

DETAILED DESCRIPTION OF THE PREFERRED EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The use of the terms "a," "an," "at least one," "one or more," and similar terms indicate one of a feature or element as well as more than one of a feature. The use of the term "the" to refer to the feature does not imply only one of the feature and element.

When an ordinal number (such as "first," "second," "third," and so on) is used as an adjective before a term, that ordinal number is used (unless expressly or clearly specified otherwise) merely to indicate a particular feature, such as to distinguish that particular feature from another feature that is described by the same term or by a similar term.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate). Similarly, where more than one device, article or other product is described herein (whether or not they cooperate), a single device/article may alternatively be used in place of the more than one device or article that is described. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

The present invention will now be described in detail on the basis of exemplary embodiments. The invention disclosed herein may be practiced using programmable digital computers and networks therefor.

Figure 1A:
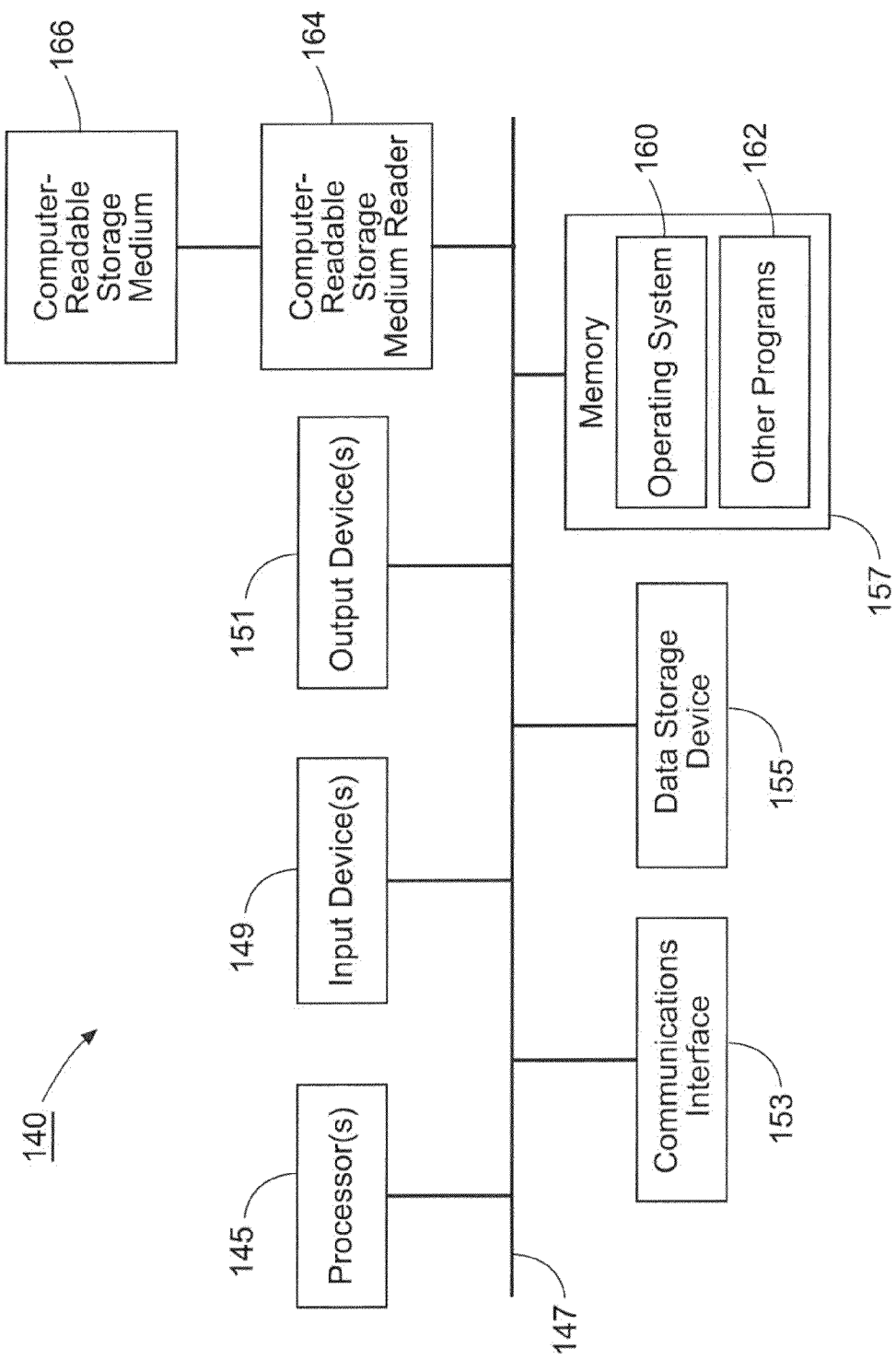
FIGS. 1A-1B block diagrams of a representative computer system.
Figure 1B:
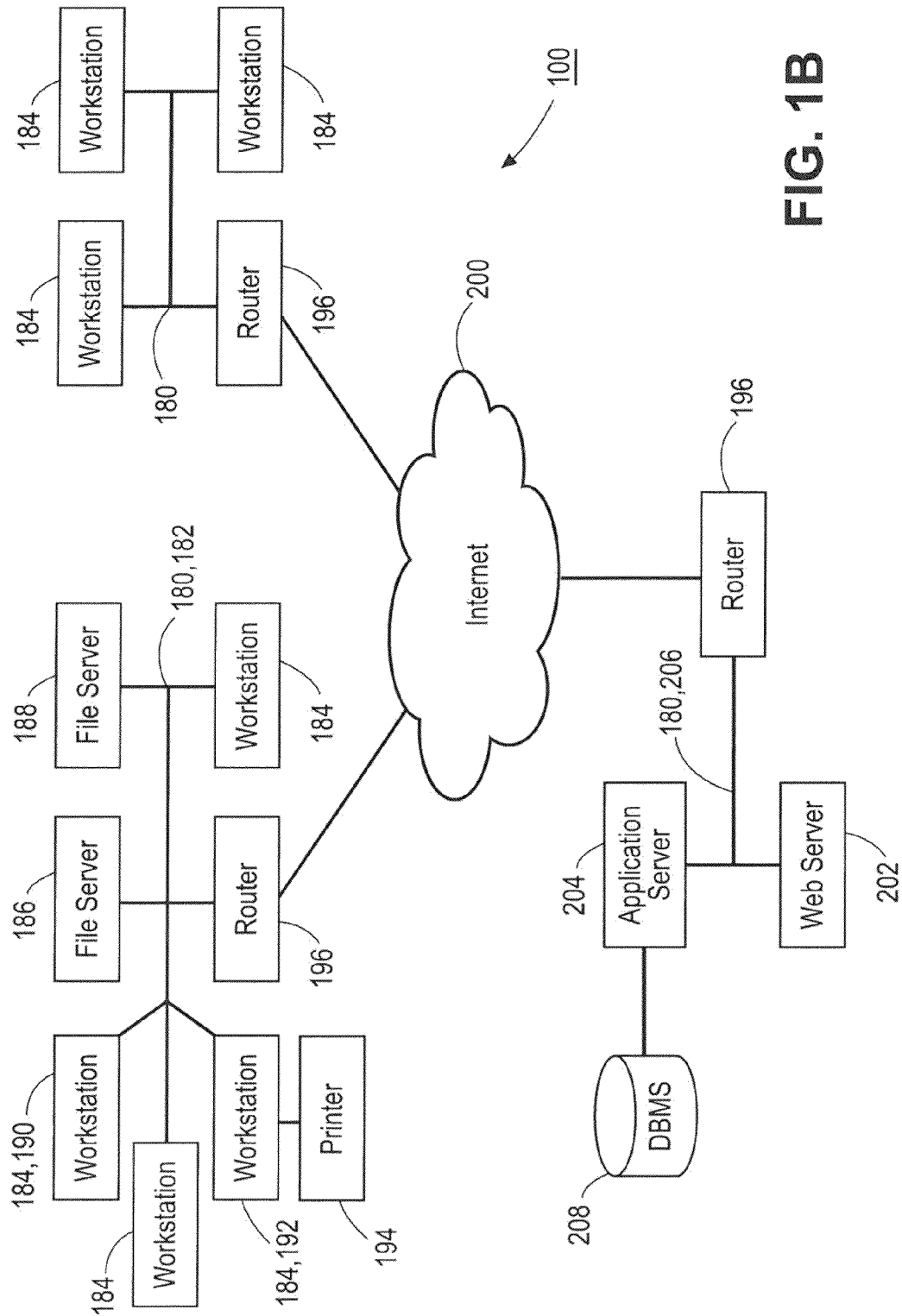

As shown in FIGS. 1A-1B, a system 100 in accordance with one aspect of the invention includes a computer 140 containing a processor 145, memory 157 and other components typically present in general purpose computers.

FIG. 1A is a block diagram of a representative computer. The computer system 140 includes at least one processor 145, such as an Intel Core™ or Xeon™ series microprocessor or a Freescale™ PowerPC™ microprocessor, coupled to a communications channel 147. The computer system 140 further includes an input device 149 such as, e.g., a keyboard or mouse, an output device 151 such as, e.g., a CRT or LCD display, a communications interface 153, a data storage device 155 such as a magnetic disk or an optical disk, and memory 157 such as Random-Access Memory (RAM), each coupled to the communications channel 147. The communications interface 153 may be coupled to a network such as the Internet.

Memory 157 stores information accessible by processor 145, including instructions that may be executed by the processor 145. It also includes data that may be retrieved, manipulated or stored by the processor. The memory may be of any type capable of storing information accessible by the processor, such as a hard-drive, memory card, ROM, RAM, DVD, CD-ROM, write-capable, and read-only memories. The processor 145 may be any well-known processor, such as processors from Intel Corporation or AMD. Alternatively, the processor may be a dedicated controller such as an ASIC.

The instructions may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

One skilled in the art will recognize that, although the data storage device 155 and memory 157 are depicted as different units, the data storage device 155 and memory 157 can be parts of the same unit or units, and that the functions of one can be shared in whole or in part by the other, e.g., as RAM disks, virtual memory, etc. It will also be appreciated that any particular computer may have multiple components of a given type, e.g., processors 145, input devices 149, communications interfaces 153, etc.

The data storage device 155 and/or memory 157 may store an operating system 160 such as Microsoft Windows 7®, Windows XP® or Vista™, Linux®, Mac OS®, or Unix®. Other programs 162 may be stored instead of or in addition to the operating system. It will be appreciated that a computer system may also be implemented on platforms and operating systems other than those mentioned. Any operating system 160 or other program 162, or any part of either, may be written using one or more programming languages such as, e.g., Java®, C, C++, C#, Visual Basic®, VB.NET®, Perl, Ruby, Python, or other programming languages, possibly using object oriented design and/or coding techniques.

Data may be retrieved, stored or modified by processor 145 in accordance with the instructions. For instance, although the system and method is not limited by any particular data structure, the data may be stored in computer registers, in a relational database as a table having a plurality of different fields and records, XML documents, or flat files. The data may also be formatted in any computer-readable format such as, but not limited to, binary values, ASCII or Unicode. By, further way of example only, image data may be stored as bitmaps comprised of pixels that are stored in compressed or uncompressed, or lossless or lossy formats (e.g., JPEG), vector-based formats (e.g., SVG) or computer instructions for drawing graphics. Moreover, the data may comprise any information sufficient to identify the relevant information, such as numbers, descriptive text, proprietary codes, pointers, references to data stored in other memories (including other network locations) or information that is used by a function to calculate the relevant data.

It will be understood by those of ordinary skill in the art that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

One skilled in the art will recognize that the computer system 140 may also include additional components and/or systems, such as network connections, additional memory, additional processors, network interfaces, input/output busses, for example. One skilled in the art will also recognize that the programs and data may be received by and stored in the system in alternative ways. For example, a computer-readable storage medium (CRSM) reader 164, such as, e.g., a magnetic disk drive, magneto-optical drive, optical disk drive, or flash drive, may be coupled to the communications bus 147 for reading from a computer-readable storage medium (CRSM) 166 such as, e.g., a magnetic disk, a magneto-optical disk, an optical disk, or flash RAM. Accordingly, the computer system 140 may receive programs and/or data via the CRSM reader 164. Further, it will be appreciated that the term "memory" herein is intended to include various types of suitable data storage media, whether permanent or temporary, including among other things the data storage device 155, the memory 157, and the CSRM 166.

Two or more computer systems 140 may be connected, e.g., in one or more networks, via, e.g., their respective communications interfaces 155 and/or network interfaces (not depicted).

A computer system network is shown in FIG. 1B. A network 182 may, for example, connect Bone or more workstations 184 with each other and with other computer systems, such as file servers 186 or mail servers 188. The connection may be achieved tangibly, e.g., via Ethernet® or optical cables, or wirelessly, e.g., through use of modulated microwave signals according to the IEEE 802.11 family of standards. A computer system that participates in the network may send data to another computer system in the network via the network connection.

One use of a network 180 is to enable a computer system to provide services to other computer systems, consume services provided by other computer systems, or both. For example, a file server 186 may provide common storage of files for one or more of the workstations 190 on a network 182. A workstation 190 sends data including a request for a file to the file server 186 via the network 182 and the file server 186 may respond by sending the data from the file back to the requesting workstation 190.

As will be recognized by those skilled in the relevant art, the terms "workstation," "client," and "server" are used herein to describe a computer's function in a particular context. A workstation may, for example, be a computer that one or more users work with directly, e.g., through a keyboard and monitor directly coupled to the computer system. A computer system that requests a service through a network is often referred to as a client, and a computer system that provides a service is often referred to as a server. But any particular workstation may be indistinguishable in its hardware, configuration, operating system, and/or other software from a client, server, or both.

In one aspect, computer 204 is a server communicating with one or more client computers 184, 192. For example, computer 204 may be one or more a web servers or hubs and data storage service. Each client computer may be configured similarly to the server 184, 192, with a processor, memory and instructions 240 (see FIG. 2). Each client computer 184, 192 may be a personal computer, intended for use by a person, having all the internal components normally found in a personal computer such as a central processing unit (CPU), display device 151 (for example, a monitor having a screen, a projector, a touch-screen, a small LCD screen, a television, or another device such as an electrical device that is operable to display information processed by the processor), CD-ROM, hard-drive, user input 149 (for example, a mouse, keyboard, touch-screen or microphone), speakers, modem and/or network interface device (telephone, cable or otherwise) and all of the components used for connecting these elements to one another. Moreover, computers in accordance with the systems and methods described herein may comprise any device capable of processing instructions and transmitting data to and from humans and other computers including general purpose computers, PDAs, network computers lacking local storage capability, and set-top boxes for televisions.

Although the client computers 184, 192 may comprise a full-sized personal computer, the system and method may also be used in connection with mobile devices capable of wirelessly exchanging data with a server over a network such as the Internet. For example, client computer 1184, 192 may be a wireless-enabled PDA such as an iPhone, and Android enabled smart phone, a Blackberry phone, or another Internet-capable cellular phone. In either regard, the user may input information using a small keyboard (in the case of a Blackberry phone), a keypad (in the case of a typical cell phone), a touch screen (in the case of a PDA and/or smart phone) or any other means of user input.

Client computers 184, 192 may include a component, such as circuits, to determine the geographic location of the device. For example, mobile device may include a GPS receiver. By way of further example, the component may include software for determining the position of the device based on other signals received at the mobile device, such as signals received at a cell phone's antenna from one or more cell phone towers if the mobile device is a cell phone.

Servers 186, 188, 202, 204 and client computers 184 and 192 are capable of direct and indirect communication, such as over a network 180, 200. Although only a few computers are depicted in FIGS. 1A-1B, it should be appreciated that a typical system can include a large number of connected computers, with each different computer being at a different node of the network 200. The network, and intervening nodes, may comprise various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems (e.g., dial-up, cable or fiber optic) and wireless interfaces.

Although certain advantages are obtained when information is transmitted or received as noted above, other aspects of the system and method are not limited to any particular manner of transmission of information. For example, in some aspects, information may be sent via a medium such as a disk, tape or CD-ROM. In other aspects, the information may be transmitted in a non-electronic format and manually entered into the system. Yet further, although some functions are indicated as taking place on a server and others on a client, various aspects of the system and method may be implemented by a single computer having a single processor.

A network 182 may be connected to one or more other networks 180, e.g., via a router 196. A router 196 may also act as a firewall, monitoring and/or restricting the flow of data to and/or from a network 180 as configured to protect the network. A firewall may alternatively be a separate device (not pictured) from the router 196

Figure 2:
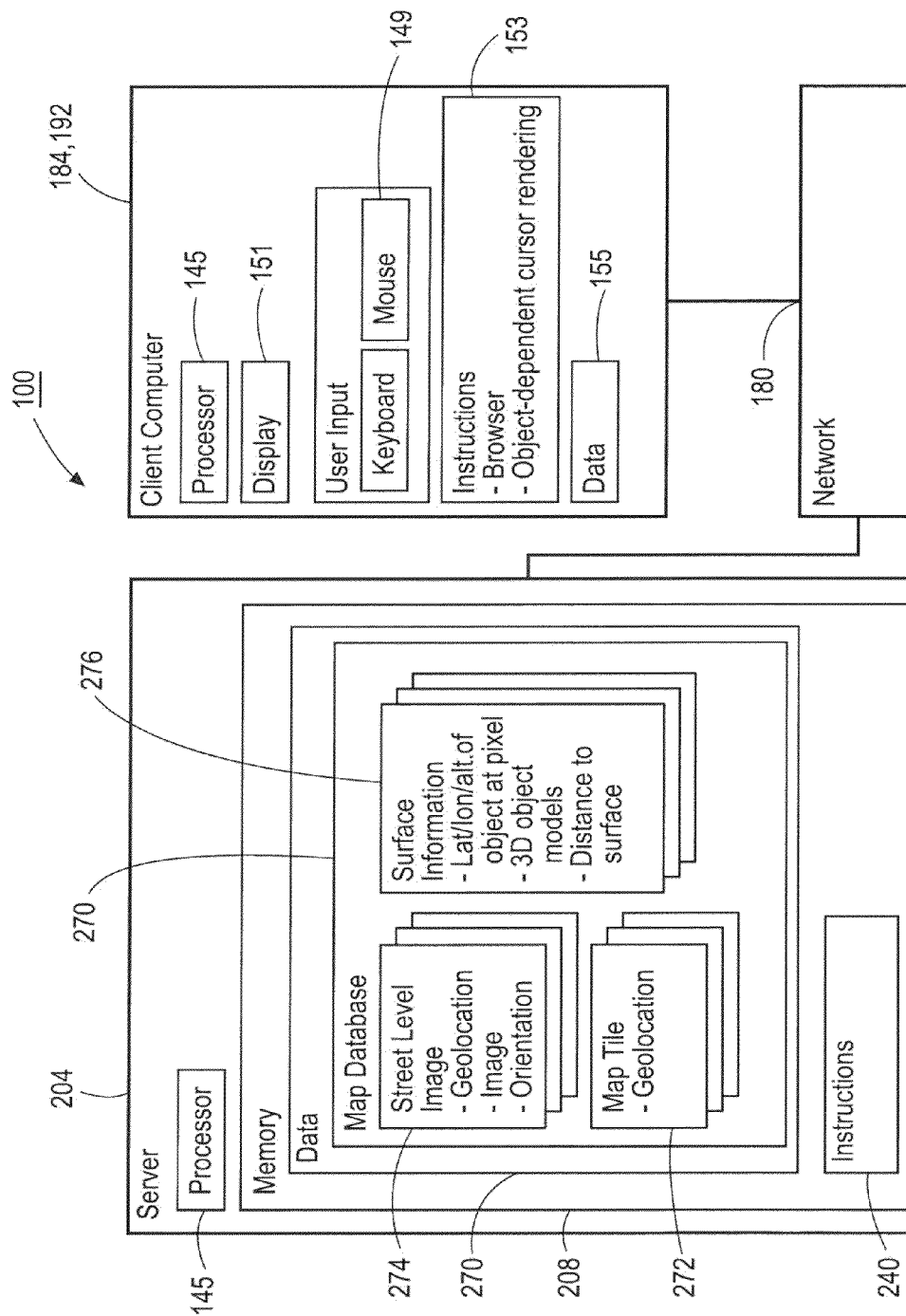
FIG. 2 is a block diagram of an exemplary embodiment of a computer system

A network of networks 180 may be referred to as an internet. The term "the Internet" 200 refers to the worldwide network of interconnected, packet-switched data networks that uses the Internet Protocol (IP) to route and transfer data. A client and server on different networks may communicate via the Internet 200. For example, a workstation 190 may request a World Wide Web document from a Web Server 202. The Web Server 202 may process the request and pass it to, e.g., an Application Server 204. The Application Server 204 may then conduct further processing, which may include, for example, sending data to and/or receiving data from one or more other data sources. Such a data source may include, e.g., other servers on the same network FIG. 2 shows one embodiment of a computers system 10 is configured to provide an electronic representation of a route. The system is programmed to store in a memory operatively coupled to at least processor, a record of a route from an origin location to a destination location. A client computer 184, 194 may be configured, for example, to have software programmed to store a record of a route locally, or the client may access a server 204 of a service provider that stores and maintains records of such routes in a DBMS 208.

The system 100 is configured to provide a user with a plurality of ground level area representations of locations corresponding locations along the recorded route including an origin location and a destination location. A description of exemplary embodiments of systems and methods for generating and providing ground level area representations can be found at in U.S. patent application Ser. No. 12/391,516, the entirety of which is incorporated by reference herein.

In one embodiment, a map database 270 of server 204 stores map-related information 272, 274, 276 at least a portion of which may be transmitted to a client device 184, 194. As shown in FIG. 2, for example, map database 270 may store map tiles 272, where each tile is a map image of a particular geographic area. Depending on the resolution (e.g., whether the map is zoomed in or out), one tile may cover an entire region such as a state in relatively little detail. Another tile may cover just a few streets in high detail. The map information is not limited to any particular format. For example, the images may comprise street maps, satellite images, or a combination of these, and may be stored as vectors (particularly with respect to street maps) or bitmaps (particularly with respect to satellite images). The various map tiles are each associated with geographical locations, such that the server 204 is capable of selecting, retrieving and transmitting one or more tiles in response to receipt of a geographical location.

As noted below, the locations may be expressed in various ways including but not limited to latitude/longitude positions, street addresses, points on a map (such as when a user clicks on a map), building names, other data capable of identifying one or more geographic locations, and ranges of the foregoing.

Electronically presented maps are available over the Internet. See, for example, Google Maps (http://maps.google.com/maps), Microsoft Bing Maps, www.mapquest.com, www.mapsonus.com, www.maps.expedia.com, www.maps.yahoo.com (accessed through www.yahoo.com), www.maps.com, www.maps.excite.com, (accessed through www.excite.com), and www.mapblast.com. Also see U.S. Pat. Nos. 4,974,170, 5,682,525 and 6,148,260, the entirety of each of which are incorporated by reference herein.

Figure 4:
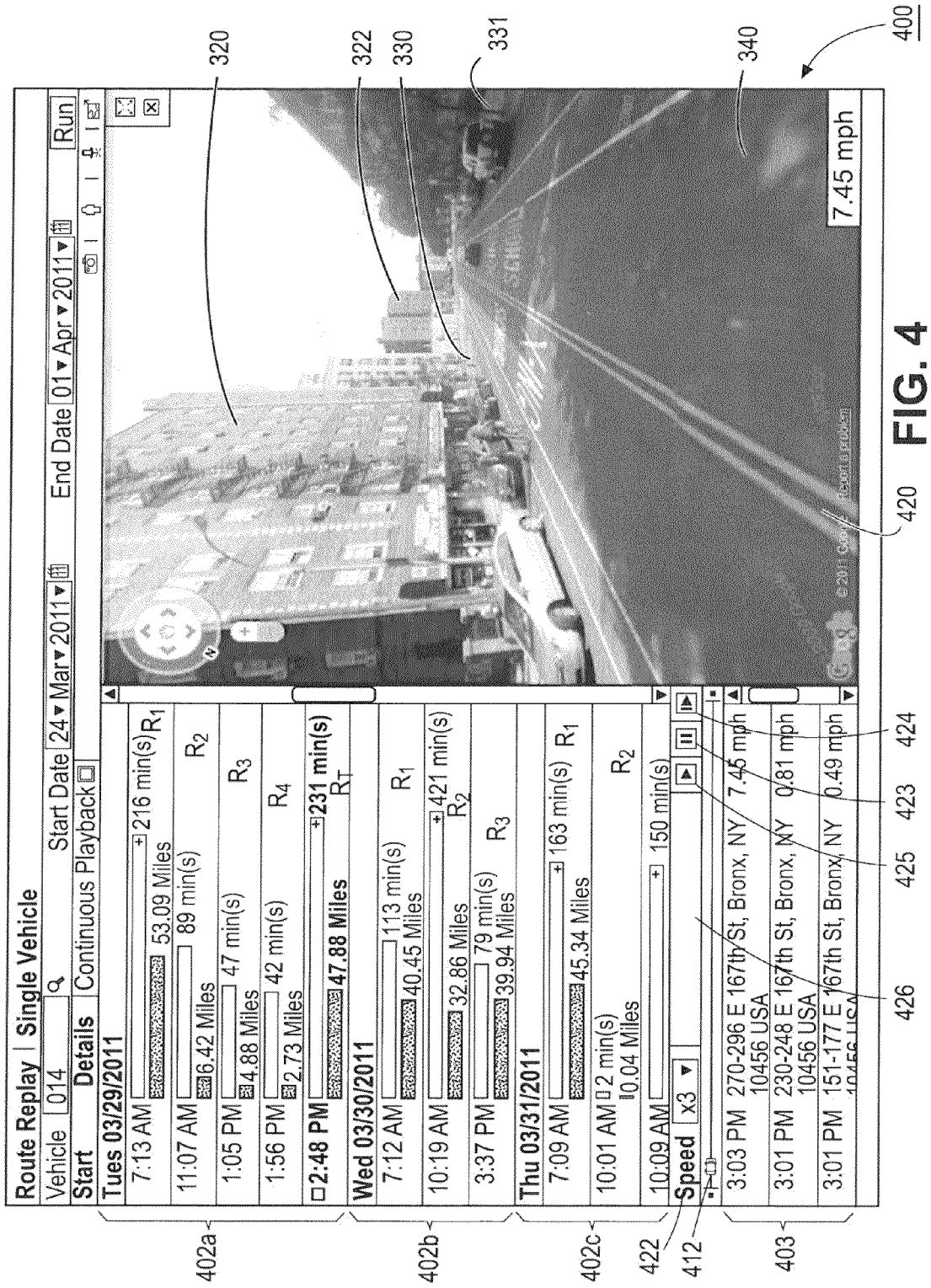
FIG. 4 depicts an exemplary display for a ground level representation of a route.

The map database may also store ground level images 274 such as "street level" images. Ground level images 274 comprise images of objects at geographic locations, captured by cameras at geographic locations, in a direction generally parallel to the ground. Thus, as shown in FIG. 4, ground level image data may represent various geographic objects such as buildings 320-22, sidewalks 330-31 and street or road 340 from a perspective of a few feet above the ground and looking down the street or road. It will be understood that while ground level image 310 only shows a few objects for ease of explanation, a typical street level image will contain as many objects associable with geographic locations (street lights, mountains, trees, bodies of water, vehicles, people, etc.) in as much detail as the camera was able to capture.

The ground level image may be captured by a camera mounted on top of a vehicle, from a camera angle pointing roughly parallel to the ground and from a camera position at or below the legal limit for vehicle heights (e.g., 7-14 feet). Ground level images are not limited to any particular height above the ground, for example, a street level image may be taken from the top of building. Panoramic street-level images up to 360 degrees may be created by stitching together a plurality of photographs taken from different camera angles.

The system 140 is configured cause the display device 155 to display thereon a plurality of sequential displays of the ground level area representations 310 for locations along a route, as shown in FIGS. 4-5. In one embodiment the route includes a first display comprising an origin location area representation; a plurality of sequential displays comprising sequential location area representations along the route; and a last display of a destination location area representation. The system 140 can be configured to receive at least one ground level image representation for each location along the route, or for selected locations along the route.

Figure 3:
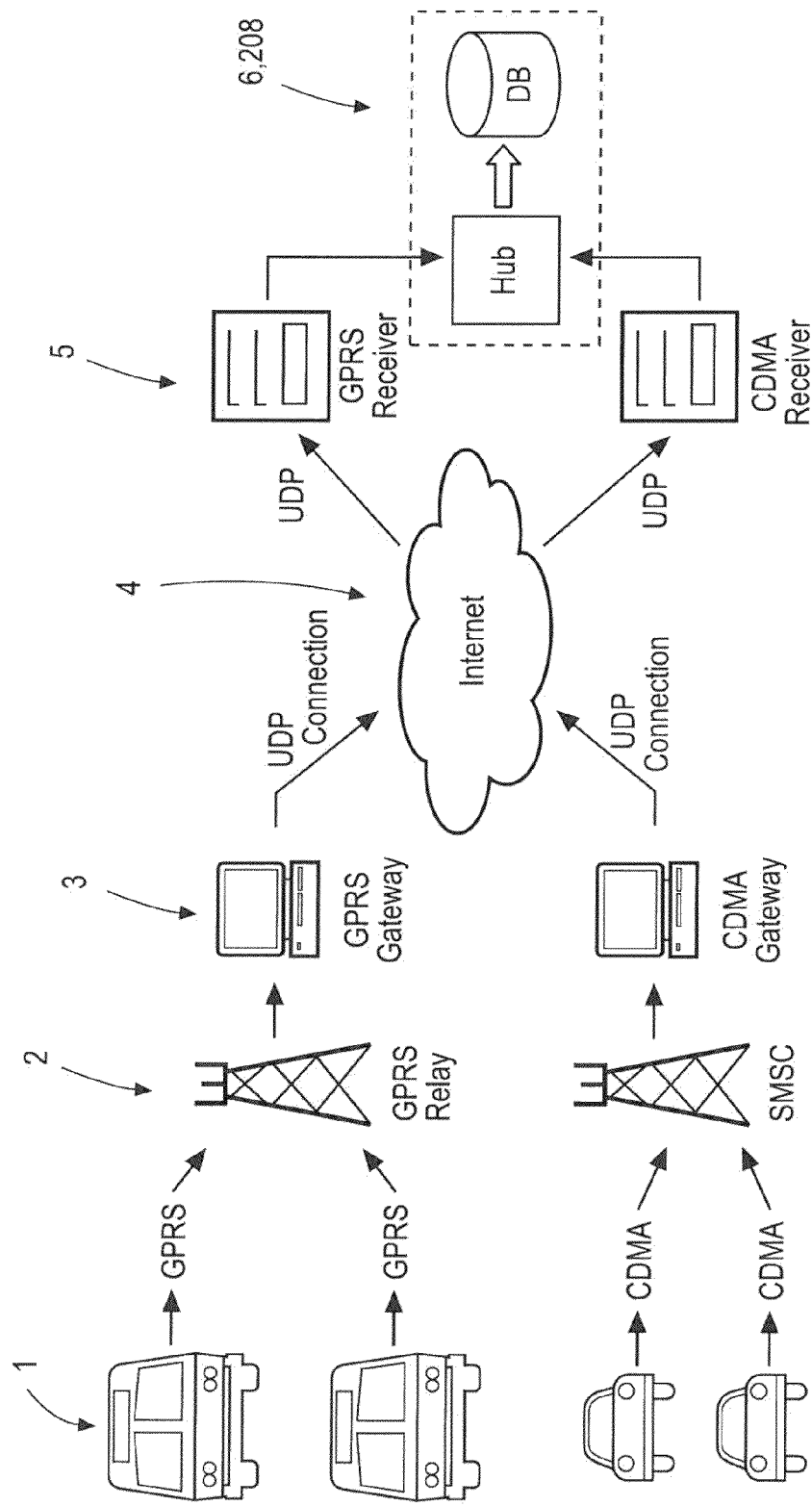
FIG. 3 depicts a representative GPS system.

In one embodiment, the system is programmed work in conjunction with a system configured to provide a record of a route recorded by a GPS (Global Positioning System) device, for example, using an on-board unit which uses technology such as GPS to monitor a vehicle's positions and transmit wireless uploads to a central host system. Referring to FIG. 3 a vehicle tracking system comprises on-board units 1 in vehicles which communicate wirelessly via mobile networks 2 to gateways 3. In this diagram two wireless protocols are indicated, namely GPRS and CDMA. However there are typically a variety of additional protocols, including EDGE, 4G Wireless protocols, protocols for WiFi and other such protocols as known to ordinarily skilled artisans. The gateways 3 communicate using protocols such as UDP or other wireless protocol via the Internet 4 with a host system having receivers 5 which are operating system services, and a data storage system 6, (such as, for example DBMS 208). The incoming data is written from the receivers 5 to the data storage system 6. GB2345824 and U.S. Pat. No. 7,388,518 describes such systems and methods therefor, the entirety of each of which are incorporated by reference herein. As will be understood, the date system storing GPS data and route data can different from the system which stores and provides map data.

One or more systems 100 can be further programmed record the route. The recorded route can then be provided to a computer system 100 configured to display the route as a map on a display device 151 of a client device 184, as described above. The computer system 100 can then be configured cause the display to display thereon the plurality of sequential displays of the ground level area representations along the recorded route so as to replicate a first person view of the route. The system 140 is configured to provide to the graphic user interface 151 a user-interactive interface to control and replay the ground level sequential displays as shown in FIGS. 4-5.

For example in one embodiment, an on-board GPS unit uploads one or more point-to-point routes it as traveled to a central host system. These traveled routes can be presented to a user on a display device 151, for example, as a layout shown in FIG. 4. At 400, the routes taken for at least one vehicle can be displayed in an interactive graphic. As shown in 400, one screen has a scrollable interface for viewing statistics and routes taken for a vehicle for a number of days 402a, 402b, 402c . . . 402n. As an alternative, routes taken for each of a fleet of vehicles on a given day could be presented. Each day or vehicle can have, for example, statistics for one or more routes R1, R2, R3, R4 . . . Rn recorded for that vehicle by an on board GPS device. The origin and destination for route can be determined in any number of ways, as for example between deliveries for a delivery service (e.g., the origin being the start of day, the destination being the first delivery point, which thereafter is the origin point for the next delivery destination, and so on until the end of a work period for vehicle operation, for example, an workday). In another example, an origin point can be the point where the vehicle's work period starts and the destination where it ends (e.g. end of vehicle operation for a given workday). The definition of a route for a vehicle can thus be defined in terms of the needs of a given business or other measurement model. Locations and time stamps can also be provided for points along the route (e.g., every 60 seconds).

For each route, a number of points representing locations along the route can be recorded from the GPS and stored at the DBMS 208 of a central host system. A displayable map can be offered as described above and as shown in 410. As shown at 410, the four routes are overlaid each with a distinguishing graphic on a displayable electronic map 410. In one embodiment, a user can select a recorded GPS route R1 for Vehicle 1 using an input device 149 such as a mouse, which would then highlight or display the route R1 on the map 410. For the selected Route R1, the user is presented with a "Route Replay"420 to give the client a first person perspective of the route.

The system 140 is configured to provide to the graphic user interface 151 a user-interactive interface to control and replay the ground level sequential displays for locations along the route R1. In one embodiment, an input control graphic 422 has user-selectable objects, selectable by a mouse or key inputs for example, has at least one fast forward object 424, at least one play 425 and/or pause object 423, and at least one rewind object 426. A user can select these objects to start, stop, and control the speed of a first person view of a sequence T1, T2, T3, T4, T5 of ground level images such as street view photographs along the route R1 recorded by the GPS, as shown in FIG. 5. At least one icon 412 could also be provided on the map 410 or in another area of the graphic which moves along with the sequence of images presented in the "Route Replay." A graphic 403 can also show locations and time stamps can also be provided for points along the route (e.g., every 60 seconds).

FIG. 5 shows a time sequence T1, T2, T3, T4, T5 . . . Tn of ground level images 420 that are presented to a user on a display device 151. As shown in FIG. 5, in one embodiment, the sequence, T1, T2, T3, T4, T5 . . . Tn of ground level images is played for locations along the route in a manner like a slide show, giving the viewer a first person view of the exact route taken by the vehicle on a time-scale proportionate to the vehicle's movement. Thus in such an embodiment, the speed, starts and stops of the vehicle will be presented so as to reflect the recorded route as traveled vehicle.

In another embodiment, a preset play speed causes the display device 151 to display thereon the plurality of sequential displays in a time sequence different than that of the speed and movement of the vehicle recorded by the GPS. Thus, for example, the sequence of ground level images such as photographs of points along the route, may be presented slower than a "real time" record of the route to allow for a more viewer-friendly presentation of the sequence of images where, for instance, a real time presentation would present the images in sequence too quickly.

In another embodiment, transitioning from image to image may be smoothed or made more continuous, as described in incorporated reference U.S. patent application Ser. No. 12/391,596. In such an embodiment a "real time" presentation of a "Route Replay" can be contemplated.

As explained above, panoramic street-level images up to 360 degrees may be created by stitching together a plurality of photographs taken from different camera angles. In another embodiment, system 140 can provide, for at least one of the plurality of locations along the route, a plurality of ground level area representations configured to display a 360 degree view of the location for the first person view.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Except to the extent necessary or inherent in the processes themselves, no particular order to steps or stages of methods or processes described in this disclosure, including the Figures, is implied. In many cases the order of process steps may be varied, and various illustrative steps may be combined, altered, or omitted, without changing the purpose, effect or import of the methods described.

Accordingly, while the invention has been described and illustrated in connection with preferred embodiments, many variations and modifications as will be evident to those skilled in this art may be made without departing from the scope of the invention, and the invention is thus not to be limited to the precise details of methodology or construction set forth above, as such variations and modification are intended to be included within the scope of the invention. Therefore, the scope of the appended claims should not be limited to the description and illustrations of the embodiments contained herein.

I claim:

1. A method of providing an electronic representation of a route, comprising, in at least one computer and a computer readable storage medium or media including computer code:

accessing a record of a route traveled by a vehicle from an origin location to a destination location, wherein the record of the route comprises point-to-point locations recorded by a GPS device associated with the vehicle;

receiving a plurality of ground level area representations of locations corresponding locations along the recorded route including an origin location and a destination location;

the at least one computer and the computer readable storage medium or media including computer code that causes the at least one computer to cause a display device to display thereon:

a plurality of sequential displays of the ground level area representations along the recorded route so as to replicate a real-time first person view of the route as travelled including:

a first display comprising an origin location area ground level representation;

a plurality of sequential displays comprising sequential location area ground level representations along the route; and a last display of a destination location area ground level representation.

2. The method of claim 1 wherein the area representation for each location comprises at least one ground level image representation of the location.

3. The method of claim 1 wherein the at least one ground level image is a photographic image.

4. The method of claim 1 wherein the method further comprises:
receiving a record of a route recorded by a GPS device.

5. The method of claim 1 wherein the method further comprises:
accessing a record of the route on a computer configured store GPS data accessing a map database to displaying the route as a map.

6. The method of claim 1 wherein the method further comprises:
displaying the plurality of sequential displays of the ground level area representations along the recorded route so as to replicate a first person view of the route.

7. The method of claim 6 wherein the method further comprises:
configuring the computer to provide to a graphic user interface an user-interactive interface to control and replay the ground level sequential displays.

8. The method of claim 6 wherein the method comprises:
receiving a record of a route recorded by a GPS device; and
displaying the plurality of sequential displays in a time sequence different than that of the speed of the GPS recorded route.

9. The method of claim 7 wherein the method further comprises:
providing, for at least one of the plurality of locations, a plurality of area representations configured to display a 360 degree view of the location for the first person view.

10. The method of claim 1 wherein the method further comprises:
accessing a database storing a plurality of the recorded routes;
wherein the at least one computer and the computer readable storage medium or media includes computer code that causes the at least one computer to cause a display device to display thereon, for each stored route, the plurality of sequential displays of the area representations along the recorded route.

11. A computer system including at least one computer processor and computer readable storage medium or media including computer code configured to provide an electronic representation of a route, the system comprising:
one or more processors programmed at least to access, from a memory operatively coupled to at least one of the processors, a record of a route traveled by a vehicle from an origin location to a destination location, wherein the record of the route comprises of point-to-point GPS location data recorded by a GPS device associated with the vehicle;

receive a plurality of ground level area representations of locations corresponding locations along the recorded route including an origin location and a destination location; and cause a display device to display thereon a plurality of sequential displays of the ground level area representations along the recorded route so as to replicate a real-time first person view of the route including a first display comprising an origin location area ground level representation;

a plurality of sequential displays comprising sequential location ground level area representations along the route; and a last display of a destination location area ground level representation.

12. The computer system of claim 1 wherein the one or more processors are further programmed at least to:
receive at least one ground level image representation for each location along the route.

13. The computer system of claim 11, wherein the at least one ground level image comprises a photographic image.

14. The computer system of claim 11, wherein the one or more processors are further programmed at least to:
access a record of a route recorded by a GPS device.

15. The computer system of claim 11, wherein the one or more processors are further programmed at least to:
access a record of the route for provision to a computer configured to display the route as map.

16. The computer system of claim 11, wherein the one or more processors are further programmed at least to cause the display to:
cause the display device to display thereon the plurality of sequential displays of the ground level area representations along the recorded route so as to replicate a first person view of the route.

17. The computer system of claim 11, wherein the computer is configured to provide to a graphic user interface a user-interactive interface to control and replay the ground level sequential displays.

18. The computer system of claim 11, wherein the one or more processors are further programmed at least to:
receive a record of a route recorded by a GPS device; and
cause the display device to display thereon the plurality of sequential displays in a time sequence different than that of the speed of the GPS recorded route.

19. The computer system of claim 11, wherein the one or more processors are further programmed at least to:
provide, for at least one of the plurality of locations, a plurality of area representations configured to display a 360 degree view of the location for the first person view.

20. The computer system of claim 11, wherein the one or more processors are further programmed at least to:
store a plurality of the recorded routes; and
cause the display device to display thereon, for each stored route, the plurality of sequential displays of the ground level area representations along the recorded route.

21. A computer program product comprising a computer-readable storage medium encoded with instructions that, when executed by at least one processor within a computer system that comprises one or more processors and a memory operatively coupled to at least one of the processors, cause the computer system at least to:

access, in a memory operatively coupled to at least one of the processors, a record of a route traveled by a vehicle from an origin location to a destination location, wherein the record of the route comprises point-to-point GPS location data recorded by a GPS device associated with the vehicle as traveled;

receive a plurality of ground level area representations of locations corresponding locations along the recorded route including an origin location and a destination location; and cause display device to display thereon a plurality of sequential displays of the ground level area representations along the recorded route so as to replicate a real-time first person view of the route including a first display comprising an origin location ground level area representation;

a plurality of sequential displays comprising sequential location ground level area representations along the route; and a last display of a destination location ground level area representation.

\* \* \* \* \*